United States Patent
Almalki et al.

(10) Patent No.: US 7,779,176 B2
(45) Date of Patent: Aug. 17, 2010

(54) SYSTEM AND METHOD OF MULTIPLE CONTROLLER CONTROL MANAGEMENT OF SHARED PERIPHERAL CIRCUITS

(75) Inventors: Safa Almalki, Nepean (CA); Wajih Bishtawi, Kanata (CA); Lucien Marcotte, Ottawa (CA); Danny Van der Elst, Deinze (BE)

(73) Assignee: Alcatel Lucent, Paris (FR)

( * ) Notice: Subject to any disclaimer, the term of this patent is extended or adjusted under 35 U.S.C. 154(b) by 1141 days.

(21) Appl. No.: 11/416,197

(22) Filed: May 3, 2006

(65) Prior Publication Data
US 2008/0005369 A1 Jan. 3, 2008

(51) Int. Cl.
*G06F 13/12* (2006.01)
*G06F 13/38* (2006.01)

(52) U.S. Cl. .......................... 710/37; 710/36

(58) Field of Classification Search .............. 710/36, 710/37
See application file for complete search history.

(56) References Cited

U.S. PATENT DOCUMENTS

| 7,398,345 | B2 * | 7/2008 | Larson et al. | 710/306 |
| 2002/0133671 | A1 * | 9/2002 | Obara et al. | 711/114 |
| 2007/0230483 | A1 * | 10/2007 | Thorne et al. | 370/401 |

* cited by examiner

*Primary Examiner*—Henry W. H. Tsai
*Assistant Examiner*—Kris Rhu
(74) *Attorney, Agent, or Firm*—Kramer & Amado P.C.

(57) ABSTRACT

A system and method for control management of shared peripheral circuits by a plurality of controllers is provided. Control of the peripherals is mediated through a shared signal controller which uses mask registers to ensure that only one controller may control a peripheral at any one time, and that the type of peripheral is matched to the type of controller.

23 Claims, 2 Drawing Sheets

SYSTEM AND METHOD OF MULTIPLE CONTROLLER CONTROL MANAGEMENT OF SHARED PERIPHERAL CIRCUITS

FIELD OF THE INVENTION

The invention relates to control management of shared peripherals in a multiple controller environment and more particularly to a system and method of managing the control of line termination cards shared by a plurality of on board controllers of a network termination card.

BACKGROUND OF THE INVENTION

In providing services to customers, network service providers are constantly trying to provide faster, more robust services, and to provide more bandwidth to customers of their communications networks. ATM is currently deployed heavily for DSL services. Service providers who possess large ATM based network infrastructures are moving towards GigE (gigabit Ethernet)/IP based infrastructure because of the benefits provided by a GigE/IP based infrastructure including the delivery of enhanced features, more bandwidth, faster service, and more features to customers. Although a transition period involving shared integration could reduce costs of a migration from ATM to GigE/IP, because ATM and GigE/ATM infrastructure are largely incompatible, shared integration is not a trivial matter.

Referring to FIG. 1A, control by a known ATM NT (network termination) card 10 of an ATM DSLAM (digital subscriber line access multiplexer) employed in an ATM based infrastructure is discussed. The ATM NT 10 has a first ATM onboard controller (OBC) 12 which is coupled by an ATM bus 2, to a number of ATM line termination (LT) cards 22. The ATM NT 10 also has a second ATM OBC 14 which is coupled to the first ATM OBC 12. The ATM OBCs 12, 14 control the operations of the ATM NT 10 such as switching (not shown) and manage the control of the ATM LT cards 22. In a known ATM NT card 10, the single first ATM OBC 12 takes care of managing the ATM LT cards 22. Although the second ATM OBC 14 shares in the general operations of the ATM NT card 10, each of the two ATM OBCs 12, 14 performs its own specific functions. As such, complete control of management of the ATM LT cards 22 is given to only one ATM OBC, namely the first ATM OBC 12 of the ATM NT card 10.

The ATM NT 10 of an ATM DSLAM is designed to work with ATM network rules, work with ATM hardware, shelving and ATM LTs 22, is designed to work with existing ATM system interfaces, and forms part of an existing ATM network infrastructure. As such, the functionality of an ATM OBC 12 to manage and control ATM LT cards 22 or other peripherals based on ATM will be compatible to manage and control only ATM LT cards 22 and those other peripherals based on ATM.

Referring to FIG. 1B, control by a known GigE/IP NT card 15 of a GigE/IP DSLAM employed in a GigE/IP based infrastructure is discussed. The GigE/IP NT 15 has a first GigE/IP OBC 17 which is coupled by a GigE/IP star bus 4, to a number of GigE/IP LT cards 24. The GigE/IP NT 15 also has a second GigE/IP OBC 19 which is coupled to the first GigE/IP OBC 17. The GigE/IP OBCs 17, 19 control the operations of the GigE/IP NT 15 such as switching (not shown) and manage the control of the GigE/IP LT cards 24. In a known GigE/IP NT card 15, the single first GigE/IP OBC 17 takes care of managing the GigE/IP LT cards 24. Although the second GigE/IP OBC 19 shares in the general operations of the GigE/IP NT card 15, each of the GigE/IP OBCs 17, 19 performs its own specific functions. As such, complete control of management of the GigE/IP LT cards 24 is given to only one GigE/IP OBC, namely the first GigE/IP OBC 17 of the GigE/IP NT card 15.

The GigE/IP NT 15 of a GigE/IP DSLAM is designed to work with GigE/IP network rules, GigE/IP LTs 24, GigE/IP system interfaces, and forms part of a GigE/IP network infrastructure. As such the functionality of a GigE/IP OBC 17 to manage and control GigE/IP LT cards 24 or other peripherals based on GigE/IP will be compatible to manage and control only GigE/IP LT cards 24 and those other peripherals based on GigE/IP.

Other known systems employ multiple controllers which share control lines or control buses to peripherals. In such a situation the controllers communicate with each other to resolve any conflicts regarding shared controls. Such a solution to coordinate control, avoid contention, and ensure no peripheral goes unmanaged, is complex and costly to implement.

Service providers have an extensive installed base of ATM DSLAM systems. As these operators begin to evolve their access networks from ATM based infrastructure towards an infrastructure based on Ethernet packet aggregation, they begin to migrate from their existing installed base of ATM DSLAM systems to GigE/IP DSLAM systems.

Service providers would rather not have to resort to dropping new GigE/IP DSLAM systems into their networks as replacements of the ATM DSLAM systems due to the cost of the GigE/IP DSLAMs, the cost of empty slots in those GigE/IP DSLAMs during the transition, and the amount of new space required for the new GigE/IP DSLAMs. The service providers would prefer a solution that could provide shared integration of both ATM and GigE/IP system interfaces and help them continue to utilize the shelves and ATM line cards that they have already paid for to facilitate a gradual migration from an ATM network infrastructure to a GigE/IP network infrastructure.

SUMMARY OF THE INVENTION

According to one aspect the invention provides for a system comprising: a first controller for controlling at least one peripheral card of a first type; a second controller for controlling at least one peripheral card of a second type; a shared signal controller coupled to said first controller for restricting the first controller to controlling said at least one peripheral card of the first type, and coupled to said second controller for restricting the second controller to controlling said at least one peripheral card of the second type; and a shared signaling and control bus coupled to said shared signal controller and for said controlling of said at least one peripheral card of the first type and for said controlling of said at least one peripheral card of the second type.

In some embodiments of the invention the shared signal controller comprises: a first mask register for restricting the first controller to controlling said at least one peripheral card of the first type; and a second mask register for restricting the second controller to controlling said at least one peripheral card of the second type.

In some embodiments of the invention the first mask register and the second mask register are coupled together and are adapted to share values for ensuring consistency of said restricting of said first controller and said restricting of said second controller.

In some embodiments of the invention the first controller is adapted to send first control signals to the first mask register and the second controller is adapted to send second control signals to the second mask register, and wherein the first mask register is adapted to forward said first control signals over said shared signaling and control bus only to a first peripheral card of said at least one peripheral card of the first type, and wherein the second mask register is adapted to forward said second control signals over said shared signaling and control bus only to a second peripheral card of said at least one peripheral card of a second type.

In some embodiments of the invention the first mask register is a master mask register, and the second mask register is a slave mask register, the slave mask register adapted to receive master mask register values from the master mask, and to modify its mask register values to be consistent in said restricting of the second controller with said restricting of said first controller, as indicated by the master mask register values.

In some embodiments of the invention the shared signal controller is adapted to allow a change in a value of the first mask register only in association with the shared signal controller allowing a change in a value of the second mask register which is consistent in restricting of the second controller with said restricting of the first controller.

In some embodiments of the invention the shared signal controller is adapted to change a value of the first mask register only if the change in the value corresponds to one of: release of control of a peripheral card of the at least one peripheral card of the first type; and adoption of control of a peripheral card of the at least one peripheral card of the first type which is not subject to ownership.

In some embodiments of the invention the first mask register is a first FPGA and the second mask register is a second FPGA.

In some embodiments of the invention the first controller is an ATM OBC on a hybrid NT of a hybrid IP/ATM DSLAM; the second controller is a GigE/IP OBC on the hybrid NT; the first mask register is an ATM mask register on the hybrid NT; the second mask register is a GigE/IP mask register on the hybrid NT; the at least one peripheral card of the first type is at least one ATM LT; and the at least one peripheral card of the second type is at least one GigE/IP LT.

In some embodiments of the invention a peripheral card of said at least one peripheral card of the first type is adapted to send type information signals to the first controller and the second controller.

In some embodiments of the invention the first controller is adapted to initialize the first mask register with use of the type information signals received from each peripheral card of the at least one peripheral card of the first type.

According to another aspect the invention provides for a system comprising: a plurality of controllers, each controller of the plurality of controllers for controlling at least one peripheral card of a respective type; a shared signal controller coupled to said plurality of controllers for restricting said each controller to controlling said at least one peripheral card of the respective type; and a shared signaling and control bus coupled to said shared signal controller and for each controller said shared signaling and control bus for said controlling of said at least one peripheral card of the respective type.

In some embodiments of the invention shared signal controller comprises: for each controller a respective mask register for restricting the controller to controlling said at least one peripheral card of the respective type.

In some embodiments of the invention each respective mask register is coupled to another respective mask register and is adapted to share values with said another respective mask register for ensuring consistency of said restricting of each controller.

In some embodiments of the invention each controller is adapted to send respective control signals to its respective mask register, and wherein each respective mask register is adapted to forward said respective control signals over said shared signaling and control bus only to said at least one peripheral card of the respective type.

In some embodiments of the invention one mask register of the plurality of mask registers is a master mask register for restricting a master controller to controlling said at least one peripheral card of the respective type, and all other mask registers of the plurality of mask registers are slave mask registers, each slave mask register adapted to receive master mask register values from the master mask register, and to modify its mask register values to be consistent in said restricting of its respective controller with said restricting of the master controller, as indicated by the master mask register values.

In some embodiments of the invention the shared signal controller is adapted to allow a change in a value of each mask register of the plurality of mask registers only in association with the shared signal controller allowing for each of all other mask registers of the plurality of mask registers, a change of a value which is consistent in restricting each controller with said restricting of each of all other controllers of the plurality of controllers.

In some embodiments of the invention the shared signal controller is adapted to change a value of a mask register of the plurality of mask registers only if the change in the value corresponds to one of: release of control of a peripheral card of the at least one peripheral card of the respective type; and adoption of control of a peripheral card of the at least one peripheral card of the respective type which is not subject to ownership.

In some embodiments of the invention a peripheral card of said at least one peripheral card of the respective type is adapted to send type information signals to each controller of the plurality of controllers.

In some embodiments of the invention each controller is adapted to initialize its respective mask register with use of the type information signals received from each peripheral card of the at least one peripheral card of the respective type.

According to another aspect, the invention provides for a method of control management comprising: restricting a first controller to controlling at least one peripheral card of a first type over a shared signaling and control bus using a first mask register coupled between the first controller and the shared signaling and control bus; and restricting a second controller to controlling at least one peripheral card of a second type over the shared signaling and control bus using a second mask register coupled between the second controller and the shared signaling and control bus.

Some embodiments of the invention further provides for sharing values between the first mask register and the second mask register for consistency of said restricting of said first controller and said restricting of said second controller.

In some embodiments of the invention the step of sharing values comprises: receiving at the second mask register, first mask register values from the first mask register; and modifying mask register values of the second mask register to be consistent in said restricting of the second controller with said restricting of said first controller, as indicated by said first mask register values.

Some embodiments of the invention further provide for allowing, with use of a contention arbitrator, a change in a value of the first mask register only in association with allowing, with use of the contention arbitrator, a change in a value of the second mask register which is consistent in restricting of the second controller with said restricting of the first controller.

Some embodiments of the invention further provide for allowing, with use of a contention arbitrator, a change in a value of the first mask register only if the change in the value corresponds to one of: release of control of a peripheral card of the at least one peripheral card of the first type; and adoption of control of a peripheral card of the at least one peripheral card of the first type which is not subject to ownership.

In some embodiments of the invention the step of restricting a first controller comprises: sending first control signals from the first controller to the first mask register; and forwarding said first control signals over said shared signaling and control bus only to said at least one peripheral card of the first type; and wherein said step of restricting the second controller comprises: sending second control signals from the second controller to the second mask register; and forwarding said second control signals over said shared signaling and control bus only to said at least one peripheral card of the second type.

Some embodiments of the invention further provide for upon a coupling of a first peripheral card of said at least one peripheral card of the first type to said shared signaling and control bus, sending type information signals from the first peripheral card to the first controller, and initializing the first mask register by the first controller with use of the type information signals from the first peripheral card.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

To ease the transition from ATM network infrastructure to GigE/IP infrastructure, a service provider could incorporate novel hybrid IP/ATM technology into the network topology. The hybrid IP/ATM technology could introduce GigE/IP functionality, and yet support legacy ATM network infrastructure. Costs of a migration from ATM to GigE/IP could be reduced by reusing hardware such as ATM LT cards in a hybrid DSLAM during the transition period. Such a hybrid DSLAM could employ a hybrid NT card which would take on all the functionality of an ATM NT and a GigE/IP NT, and service both ATM LTs and GigE/IP LTs. Servicing different kinds of LT cards which have different network protocols and interfaces (ATM and GigE/IP) requires that the control functionality of the OBCs of the NT be capable of controlling and managing both ATM LTs and GigE/IP LTs. In a more complicated solution for shared integration, such a functionality requirement could be met with a single OBC with dual functionality. This however would require the design and fabrication of a new dual function OBC.

The preferred embodiment of the invention provides a system for managing the control of different types of LT cards of a hybrid DSLAM by a plurality of type specific OBCs. Specifically, an ATM OBC capable of control and management of ATM LTs is only tasked with control and management of ATM LTs, and a GigE/IP OBC capable of control and management of GigE/IP LTs is only tasked with control and management of GigE/IP LTs. As a result OBCs do not need to be reconfigured to manage and control types of cards they were not originally designed to control and manage. As described below, the ATM OBC and a GigE/IP OBC share a control bus to both ATM LT cards and GigE/IP LT cards in the hybrid DSLAM. Each LT slot can be managed by either the GigE/IP OBC or the ATM OBC on the hybrid NT card depending upon which type of card occupies the slot. The system to ensure controlled management of shared LT slots ensures that functions such as OBC communications and H/W resets of the LTs are handled appropriately by the appropriate OBC.

Figure 1A:
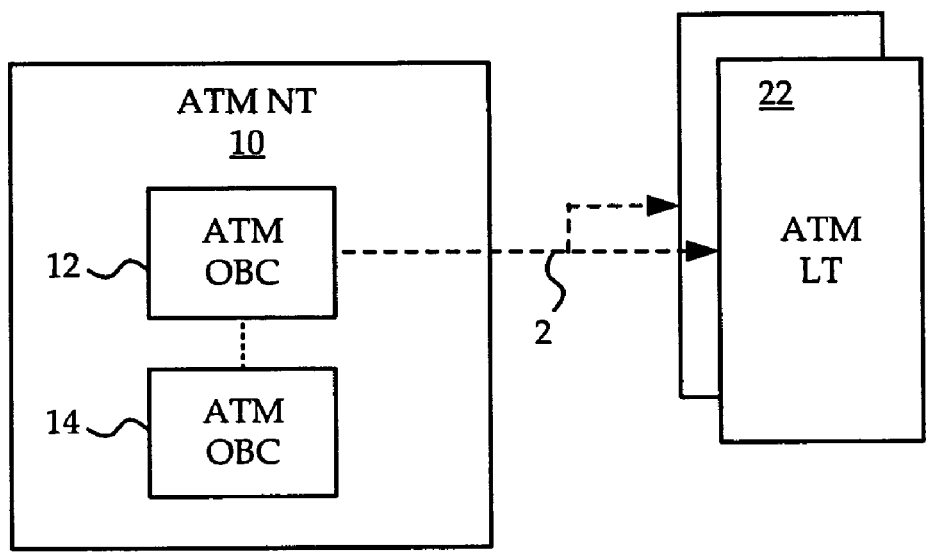
FIG. 1A is a block diagram of control management of ATM LTs by a known ATM NT.
Figure 1B:
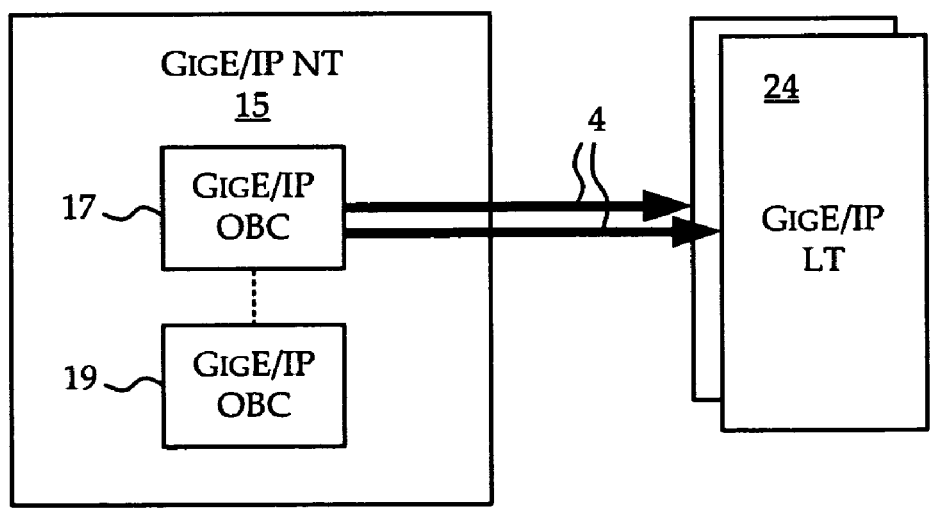
FIG. 1B is a block diagram of control management of GigE/IP LTs by a known GigE/IP NT.
Figure 2:
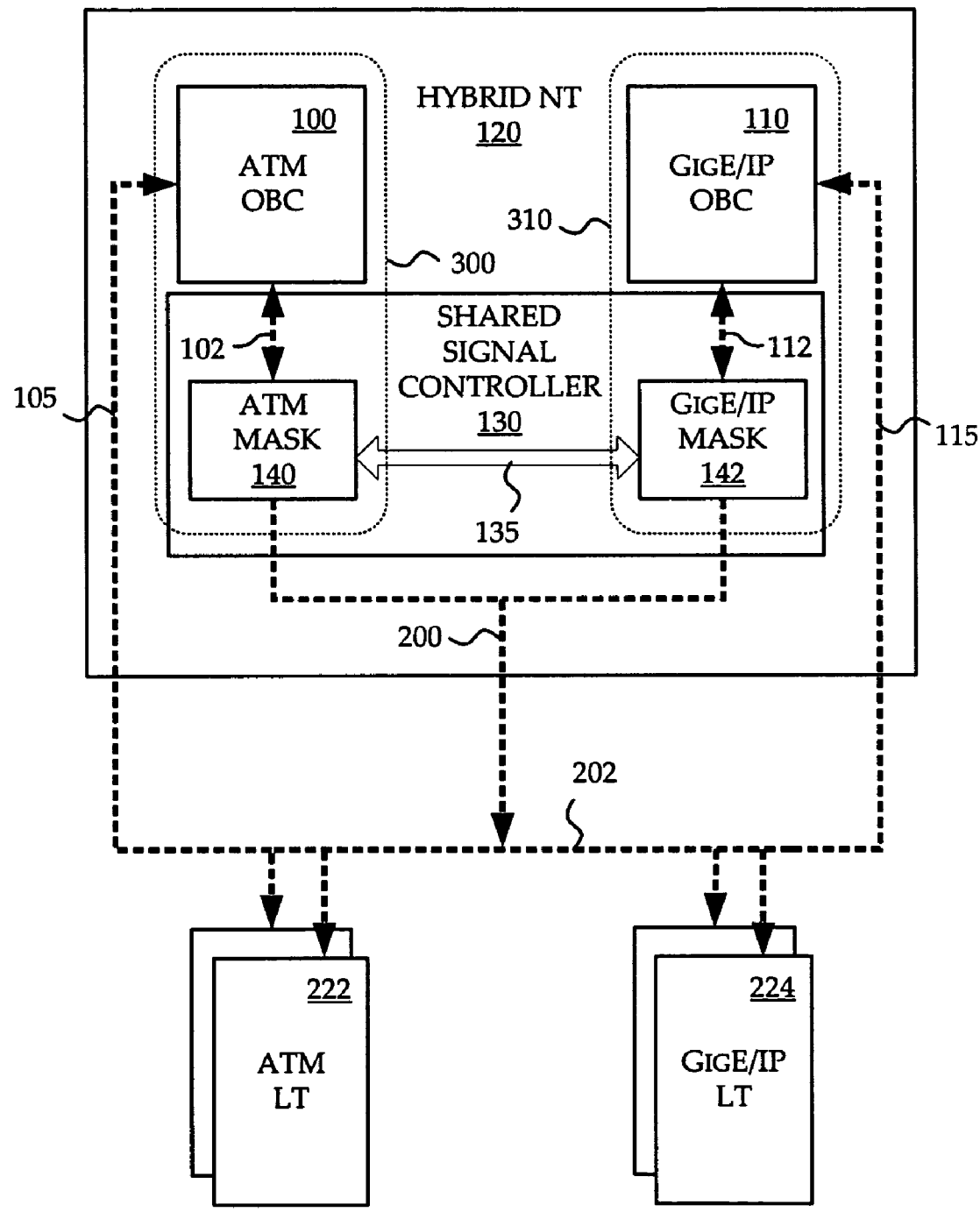
FIG. 2 is a block diagram of control management of a plurality of LTs by a hybrid NT according to a preferred embodiment of the invention.

Referring to FIG. 2, a system for control management of a plurality of LTs by multiple controllers of a hybrid NT of a DSLAM is discussed in terms of structure.

A hybrid NT 120 comprises an ATM OBC 100 for control and management of a number of ATM LTs 222. The hybrid NT 120 comprises a GigE/IP OBC 110 for control and management of a number of GigE/IP LTs 224.

The ATM LTs 222 and the GigE/IP LTs 224 are coupled by a shared signaling and control bus 202 to the ATM OBC 100 and the GigE/IP OBC 110. The shared signaling and control bus 202 is for backplane signaling and is terminated at the hybrid NT 120.

The ATM OBC 100 is coupled to a shared signal controller 130 via ATM control lines 102. The ATM control lines 102 are coupled to an ATM mask register 140.

The GigE/IP OBC 110 is coupled to the shared signal controller 130 via GigE/IP control lines 112. The GigE/IP control lines 112 are coupled to a GigE/IP mask register 142.

In an exemplary embodiment, the mask registers 140, 142 are FPGAs (field programmable gate arrays). The mask registers 140, 142 could also be ASICs (application specific integrated circuits), and in general can be implemented in software, hardware, or any combination of software and hardware.

Each mask register 140, 142 is coupled to the signaling and control bus 202 via masked control lines 200. The mask registers 140, 142 are also coupled to each other via mask exchange connections 135.

The ATM OBC 100, the ATM control line 102, and the ATM mask register 140 are collectively referred to as the masked ATM control portion 300 of the hybrid NT 120.

The GigE/IP OBC 110, the GigE/IP control line 112, and the GigE/IP mask register 142 are collectively referred to as the masked GigE/IP control portion 310 of the hybrid NT 120.

Each ATM LT card 222 and each GigE/IP LT card 224 occupy a subscriber card slot (not shown) of the hybrid DSLAM. Each subscriber slot has an interface to the shared signaling and control bus 202.

The system for control management of a plurality of LTs by multiple controllers of a hybrid NT of a DSLAM depicted in FIG. 2 is now discussed in terms of function.

In the hybrid DSLAM, each subscriber card slot can be populated with an ATM LT 992 or a GigE/IP LT 224. As noted above, the GigE/IP OBC 110 and the ATM OBC 100 must have exclusive control of its respective group of LTs 224, 222. The coordination of control occurs with use of the shared signal controller 130.

The ATM LTs 222 and GigE/IP LTs 224 announce their presence to the ATM OBC 100 and the GigE/IP OBC 110 by broadcasting presence and slot identification signals to both OBCs 100, 110. The presence and slot identification signals are represented by the numerals 105 and 115 at portions of the signaling and control bus 202 leading to the OBCs 100 and 110. Each OBC on the hybrid NT card 120 therefore detects the presence of each LT card and knows which specific slot each card is situated in.

ATM OBC 100 controls and manages the ATM LT cards 222 by control signals sent over ATM control line 102. Control signals for the ATM LT cards 222 could include reset, disable, and power off commands. In order to manage the control signals from the ATM OBC 100, they are passed through the shared signal controller 130 to the ATM mask register 140. The ATM mask register 140 defines which slots and hence which LT cards 222, 224 the ATM OBC 100 may take control of. Control signals from the ATM OBC 100 only pass from the ATM mask register 140 over the masked control lines 200 to the shared signaling and control bus 202 if the control signals are destined for slots populated by ATM LT cards 222. In this manner the ATM mask register 140 masks the controls and indicates to the ATM OBC 100 which slots it is managing.

The values in the ATM mask register 140 indicate which slots of the hybrid DSLAM are controlled by the ATM OBC 100, and which slots are externally managed and hence not to be managed by the ATM OBC 100. Slots occupied by GigE/IP LTs 224 are defined as being externally managed because they are not managed by the ATM OBC 100, but instead are managed by the GigE/IP OBC 110.

GigE/IP OBC 110 controls and manages the GigE/IP LT cards 224 by control signals sent over GigE/IP control line 112. Control signals for the GigE/IP LT cards 224 could include reset, disable, and power off commands. In order to manage the control signals from the GigE/IP OBC 110, they are passed through the shared signal controller 130 to the GigE/IP mask register 142. The GigE/IP mask register 142 is set such that it defines which slots and hence which LT 222, 224 cards the GigE/IP OBC 110 may take control of. Control signals from the GigE/IP OBC 110 only pass from the GigE/IP mask register 142 over the masked control lines 200 if they are destined for slots populated by GigE/IP LT cards 224. In this manner the GigE/IP mask register 142 masks the controls and indicates to the GigE/IP OBC 110 which slots it is managing.

The values in the GigE/IP mask register 142 indicate which slots of the hybrid DSLAM are controlled by the GigE/IP OBC 110, and which slots are externally managed and hence not to be managed by the GigE/IP OBC 110. Slots occupied by ATM LTs 222 are defined as being externally managed because they are not managed by the GigE/IP OBC 110, but instead are managed by the ATM OBC 100.

The ATM mask register 140 and the GigE/IP mask register 142 of the shared signal controller 130 are set so that the two OBCs 100, 110 never attempt to control the same LT card. Without the shared signal controller 130 control signal access to all of the LT cards 222, 224 would be available to both OBCs 100, 110 and nothing would prevent contention nor prevent an attempt by a malfunctioning or misdirected OBC to control an LT of the wrong type.

In the preferred embodiment one of the OBCs 100, 110 acts as what is referred to as a master OBC, and the mask register 140, 142 in the same mask control portion 300, 310 as the OBC 100, 110 is referred to as a master mask register. The mask exchange connections 135 are used to transmit mask register values from the master mask register to the other mask register (referred to as the slave mask register). The slave mask register does not communicate any of its values back to the master mask register but instead simply adopts values in order to be consistent with the master mask register regarding ownership of control of the peripherals. In this type of implementation the OBC 100, 110 of the master mask register is referred to as the master OBC, and the OBC 100, 110 which controls the slave mask register is referred to as the slave OBC. Since the slave OBC and the slave mask register must adopt settings consistent with control as configured by the master OBC and the master mask register, no conflicts or contention for control of peripheral slots occur.

As a further check that the mask registers are configured properly, in some embodiments an operator may view a current configuration of the local mask register which provides a view of the equipment types configured to be controlled by the local OBC, allowing the operator to take appropriate action to correct any anomalies.

The preferred embodiment being a master-slave implementation as discussed above has the advantages of simplicity and consistency. The mask register values are simply copied via the mask exchange connections 135, and since the slave adopts these copied values, neither contention nor complex coordination and processing become a problem.

In alternative embodiments without a master-slave implementation, in order to ensure consistency, the ATM mask register 140 and the GigE/IP mask register 142 can communicate with one another over mask exchange connections 135. The values of the ATM mask register 140 are passed to the GigE/IP mask register 142 and vice versa, over the mask exchange connection 135. In this masterless embodiment both the ATM mask register 140, and the GigE/IP mask register 142 may be seen as peer mask registers.

Each one of the peer mask registers 140, 142 can alter its values in response to a change in the values of the other one of the mask registers 140, 142 in order to ensure proper control of the LT cards. This allows an update of the ATM mask register 140 at any time in response to a change in the GigE/IP mask register 142, and an update of the GigE/IP mask register 142 at any time in response to a change in the ATM mask register 140.

This masterless configuration allows an operator to reconfigure both mask registers simply by changing only one mask register from either OBC 100, 110. If the hybrid NT card 120 is administered properly by the operator by configuration of one mask register at a time, no conflicts or contention would arise. If however an OBC 100, 110 were to attempt to change the mask register of its respective mask control portion 300, 310 simultaneously or erroneously, presence of a contention arbitrator would be preferable in order to coordinate updates to the mask registers 140, 142 and avoid contention.

Although, each mask register 140,142 can determine a value of the other because of information exchange over the exchange connection, sometimes, restrictions for coordination and consistency in the modification of the values of the mask register are desirable. Such restrictions to the modification of the mask registers may be effected through the use of a contention arbitrator. In some embodiments the contention arbitrator is implemented on the shared signal controller 130. The shared signal controller 130 acting as a contention arbitrator allows changes to the values of the mask registers 140, 142 based on certain criteria. Generally to avoid contention, the shared signal controller 130 allows or disallows modification of the mask register 140, 142 values by an OBC 100, 110. The particular rules for allowing or disallowing modification of the mask registers 140, 142 will depend upon the context and application in which the hybrid DSLAM and its peripherals operate.

In one implementation the contention arbitrator does not permit an OBC 100, 110 to modify a mask register 140, 142 value to gain control of a peripheral if control of that peripheral is already claimed by another OBC 100, 110, and only permits modification of the mask register value if the other OBC 100, 110 releases control of that peripheral. In this embodiment the contention arbitrator only allows a mask register to be changed if the change corresponds to releasing control of a peripheral slot, or if it corresponds to claiming control of an unclaimed peripheral. In this embodiment release of control of a peripheral slot occurs before control of a peripheral in that slot is taken over by another OBC 100, 110. In this embodiment a configuration table accessible to the contention arbitrator is used to keep track of which OBC has claimed control of which slot, irrespective of the default values of the register masks themselves.

It should be noted that the contention arbitrator may also be implemented elsewhere on the hybrid NT 120 as long as it is capable of restricting modification of the mask registers.

In some embodiments, the hybrid NT 120 is implemented on a GigE/IP NT (referred to as a motherboard) having a GigE/IP OBC 110, and a shared signal controller 130. The GigE/IP NT has a daughter card installed on it which acts as an ATM NT and which comprises the ATM OBC 100. In other embodiments, the motherboard is an ATM NT which has an ATM OBC 100 and a shared signal controller 130. In this case the ATM NT has a daughter card installed on it which acts as a GigE/IP NT and comprises a GigE/IP OBC 110. In either motherboard implementation, the GigE/IP mask register 142 and the ATM mask register 140 may be set initially to settings consistent with the assumed default operation of the hybrid NT.

The OBC 100, 110 of the motherboard (whichever one it is), would typically be used to perform the required initialization of its corresponding mask register 140, 142 in its control portion 300, 310. The other mask register would be initialized via communication from the corresponding mask register over the mask exchange connection 135. Typically in a motherboard/daughter card configuration, the OBC 100, 110 of the motherboard takes on the role of master OBC and the mask register in its respective masked control portion 300, 310 is the master mask register. In such an implementation the OBC 100, 110 on the daughtercard is a slave OBC and the mask register 140, 142 in the control mask portion 300, 310, of the slave OBC acts as a slave mask register.

The motherboard used in the hybrid NT 120 motherboard/daughter card combo may be configured so that it may also be deployed as a standalone NT card, to reduce manufacturing and production costs. For example, a hybrid NT motherboard which would act as a GigE/IP NT when installed in a hybrid IP/ATM DSLAM and equipped with an ATM NT daughter card, could be used as a standard GigE/IP NT without a daughter card in a standard GigE/IP DSLAM.

In some embodiments, the hybrid NT 120 is implemented on a single board having thereon the GigE/IP OBC 110, the ATM OBC 100, and the shared signal controller 130. In such an embodiment an OBC 100, 110 of the single board would be used to perform the required initialization of its corresponding mask register 140, 142 in its control portion 300, 310. The other mask register would be initialized via communication from the corresponding mask register over the mask exchange connection 135. Similar to as discussed above, in some embodiments the shared signal controller 130 of the single board hybrid NT 120 acts as a contention arbitrator.

In a masterless embodiment, initialization could also be carried out by a user accessing the mask registers through a contention arbitrator. It could also be carried out automatically by any OBC or the contention arbitrator, if type information is automatically sent from the LT cards.

In some embodiments, the hybrid NT may be initialized in a "default" mode, for example when it is to be deployed in an environment in which it begins operation with only one type of LT card (for example GigE/IP or ATM). In this case, the OBC 100, 110 of the same type as the initially installed cards would perform the initialization, and the mask registers 140, 142, would be set so that the OBC 100, 110 of the same type as the initial LT cards would have initial ownership of the control of all of the LT slots. The mask registers will of course change as LT cards are installed and detected. The hybrid NT may also be initialized in the default mode, when it is to be deployed in an environment in which it begins operation with both ATM LT cards 222 and GigE/IP LT cards 224 present and requiring control, but in which only one of ATM LTs 222 or GigE/IP LTs 224 are the default type of card expected to be present.

In the case where ATM DSLAMs are being upgraded with hybrid NT 120 cards and GigE/IP LT cards 224, since the default type of card would be an ATM LT, the ATM mask register 140 and the GigE/IP mask register 142 can be set so that the initial control of all the slots is given to the ATM OBC 110 whether or not the ATM OBC 110 is on a motherboard, a daughter card or a single board.

During equipment configuration of the hybrid NT 120 for use in a hybrid DSLAM, an operator would configure the shared signal controller through either the ATM OBC 100 or the GigE/IP OBC 110 (referred to herein as the local OBC). The operator, using a configuration program, would indicate which LTs are to be managed by the local OBC. This information would be used to update the "local" mask register in the same masked control portion 300, 310 as the local OBC. The other mask register would be updated to be consistent with the local mask register via the mask exchange connection 135. In a similar manner to that discussed above, initialization may occur with or without coordination of a contention arbitrator.

In an exemplary embodiment, each LT card additionally sends type information signals to the OBCs 100, 110 which indicate the type of LT card (ATM or GigE/IP) it is.

In an exemplary embodiment in which the LT cards send type information signals to the ATM OBC 100 and the GigE/IP OBC 110, no operator configuration is necessary once the LT cards are installed. One OBC would automatically set the mask register in the same masked control portion as the OBC with use of the type information signals received from the LT cards. The other mask register could be updated to be consistent with it via the mask exchange connection 135, and the other OBC could confirm the mask register settings by checking the type information signals it also received from each of the LT cards. In this embodiment the contention arbitrator would typically not be present. In order to protect against erroneous requests by a malfunctioning OBC 100, 110 to change settings of a mask register 140, 142 to be inconsistent with the actual types of cards in the LT slots, a contention arbitrator could be used to ensure that no OBC 100, 110, may change a setting of the a mask register unless it is consistent with the actual configuration reported by the installed LT cards.

In another implementation a configuration table accessible to the contention arbitrator is initialized with use of type information from the peripheral cards. In this automated implementation, the contention arbitrator only allows modification of a mask register if it is consistent with the configuration table.

After the hybrid NT 120 is configured, the hybrid NT 120 can take control of the equipment. Once started, the hybrid NT 120 takes appropriate action to provision the LTs 222, 224. The ATM OBC 100 takes care of provisioning the ATM LT cards 222 while the GigE/IP OBC 110 takes care of provisioning of the GigE/IP LT cards 224. Each LT card is reset and after the LT card boots up, it reports its alive indication to the hybrid NT 120 via the appropriate communication channel on the shared signaling and control bus 202 which then initiates the download of the LT application software.

The use of a mask register 140, 142 to control the access to the shared signaling and control bus 202 of the preferred embodiment is beneficial due to its simplicity. The OBCs need not communicate to each other, they each simply need to read and write to one of two mask registers which update each other.

Another benefit is consistency. The default configuration of the mask registers ensures that an upgrade from an ATM NT of an ATM DSLAM to a hybrid NT 120 of a hybrid DSLAM results in the same operational condition after the upgrade as before without requiring any configuration changes.

Another benefit is flexibility for adaptation after a migration from ATM DSLAM system infrastructure to GigE/IP DSLAM system infrastructure. In the case that the motherboard acts as a GigE/IP NT, when the ATM LTs are no longer used, the daughter card acting as the ATM NT may be removed, and the hybrid DSLAM could then operate as a GigE/IP based DSLAM with GigE/IP LTs only.

It should be noted that although the specific example of FIG. 2 shows only two types of OBCs, and two types of LT cards, the system and method of control management can equally be applied to a plurality of types of controllers and peripheral cards.

In these embodiments, the hybrid NT 120 functions as a network terminator for more than two types of LT cards. This hybrid NT has more than two OBCs, each OBC for controlling and managing each specific type of LT card. In these embodiments, the shared signal controller 130, has more than two mask registers, each one for managing the control signals to each type of peripheral card.

In a similar manner to that discussed above, this hybrid NT 120 for more than two types of LT cards may be implemented in a master-slave configuration. In a master-slave implementation, there is only one master OBC and one master mask register, the remaining OBCs and mask registers being slave OBCs and slave mask registers respectively. Each slave mask register simply adopts values in order to be consistent with the master mask register regarding ownership of control of the peripherals, while each slave OBC simply reads the values of its respective slave mask register to determine which LT slots it has control of.

Alternatively, some hybrid NT 120 cards for more than two types of LT cards are in a masterless configuration without a contention arbitrator. In this case each of the mask registers are coupled to each other as peer mask registers to ensure that the mask registers are consistent in deciding which controller may control which peripheral.

Some hybrid NT 120 cards for more than two types of LT cards are in a masterless configuration with a contention arbitrator. Here the contention arbitrator is used to coordinate updates of the mask registers and ensures that they are consistent with the proper controlling of each LT by the appropriate OBC.

In general, according to the preferred embodiment, the system and method may be said to provide mediation of control of the peripherals through a shared signal controller which uses mask registers to ensure that only one controller may control each peripheral at any one time, and that the type of peripheral is matched to the type of controller.

Service providers looking to replace their large investment in existing ATM DSLAMs and ATM network infrastructure with GigE/IP DSLAMs and GigE/IP infrastructure are finding it difficult to switch due to the amount of the existing equipment and the cost such a migration from ATM to GigE/IP entails.

A migration path from ATM DSLAMs to GigE/IP DSLAMs which allows for gradual introduction and switching from the old ATM equipment to new GigE/IP based equipment is preferred as part of a DSL services migration from an ATM network infrastructure to a GigE/IP network infrastructure.

Service providers can use the hybrid NT 120 as part of such a migration path from ATM DSLAMs to GigE/IP DSLAMs by providing a DSLAM with hybrid capability. The hybrid NT 120 immediately brings GigE/IP NT capabilities and support for GigE/IP LT line cards to an ATM infrastructure, while providing for gradual migration to a GigE/IP network infrastructure by allowing customers to re-use their existing ATM DSLAM infrastructure while replacing existing ATM DSLAMs. As hybrid NTs 120 are introduced into the ATM network infrastructure, existing ATM hardware, services, and system interfaces can be re-used with the hybrid NT 120 while new GigE/IP DSLAM capabilities are introduced into the network infrastructure. In this manner service providers can plan to integrate the GigE/IP based network topology into their networks without throwing away existing ATM based network infrastructure. Most of the heavily deployed ATM based ATM DSLAM equipment may be re-used during the introduction of next generation GigE/IP DSLAM capabilities avoiding the large economical burden that would be associated with a massive decommissioning of ATM network infrastructure resources and the simultaneous deployment of all new GigE/IP based network infrastructure.

In general network service providers benefit from the ability to leverage deployed platforms and minimize operational discontinuities in the migration from ATM to GigE/IP. The upgrade process afforded by the hybrid NT 120 with the system and method for management of control of ATM LTs and GigE/IP LTs should take significantly less time than a drop-in-and-replace overlay type installation and represents a fast and cheap way for current customers to achieve significant video coverage for their subscribers.

Although reference has been made to GigE/IP it is to be understood that the hybrid NT, may operate at various speeds and in general works with Ethernet/IP rules.

The embodiments presented are exemplary only and persons skilled in the art would appreciate that variations to the embodiments described above may be made without departing from the spirit of the invention. The scope of the invention is solely defined by the appended claims.

We claim:
1. A system comprising:
  a first controller for controlling at least one peripheral card of a first type;
  a second controller for controlling at least one peripheral card of a second type;
  a shared signal controller coupled to said first controller for restricting the first controller to controlling said at least one peripheral card of the first type, and coupled to said second controller for restricting the second controller to controlling said at least one peripheral card of the second type, wherein the shared signal controller comprises:

a first mask register for restricting the first controller to controlling said at least one peripheral card of the first type; and a second mask register for restricting the second controller to controlling said at least one peripheral card of the second type; and a shared signaling and control bus coupled to said shared signal controller and for said controlling of said at least one peripheral card of the first type and for said controlling of said at least one peripheral card of the second type, wherein the first mask register and the second mask register are coupled together and share values to ensure consistency of said restricting of said first controller and said restricting of said second controller.

2. The system according to claim 1, wherein the first controller sends first control signals to the first mask register, the second controller sends second control signals to the second mask register, the first mask register forwards said first control signals over said shared signaling and control bus only to a first peripheral card of said at least one peripheral card of the first type, and the second mask register forwards said second control signals over said shared signaling and control bus only to a second peripheral card of said at least one peripheral card of a second type.

3. The system according to claim 2, wherein the first mask register is a master mask register, the second mask register is a slave mask register, the slave mask register receives master mask register values from the master mask register, and the slave mask register modifies its mask register values to be consistent in said restricting of the second controller with said restricting of said first controller, as indicated by the master mask register values.

4. The system according to claim 2, wherein the shared signal controller allows a change in a value of the first mask register only in association with the shared signal controller allowing a change in a value of the second mask register which is consistent in restricting of the second controller with said restricting of the first controller.

5. The system according to claim 3, wherein the shared signal controller changes a value of the first mask register only if the change in the value corresponds to one of:

release of control of a peripheral card of the at least one peripheral card of the first type; and adoption of control of a peripheral card of the at least one peripheral card of the first type which is not subject to ownership.

6. The system according to claim 2, wherein the first mask register is a first FPGA and the second mask register is a second FPGA.

7. The system according to claim 6, wherein the first controller is an ATM OBC on a hybrid NT of a hybrid IP/ATM DSLAM; the second controller is a GigE/IP OBC on the hybrid NT; the first mask register is an ATM mask register on the hybrid NT; the second mask register is a GigE/IP mask register on the hybrid NT; the at least one peripheral card of the first type is at least one ATM LT; and the at least one peripheral card of the second type is at least one GigE/IP LT.

8. The system according to claim 2, wherein a peripheral card of said at least one peripheral card of the first type sends type information signals to the first controller and the second controller.

9. The system according to claim 8, wherein the first controller initializes the first mask register with use of the type information signals received from each peripheral card of the at least one peripheral card of the first type.

10. A system comprising:

a plurality of controllers, each controller of the plurality of controllers for controlling at least one peripheral card of a respective type;

a shared signal controller coupled to said plurality of controllers for restricting said each controller to controlling said at least one peripheral card of the respective type, wherein the shared signal controller comprises: for each controller a respective mask register for restricting the controller to controlling said at least one peripheral card of the respective type, and each respective mask register is coupled to another respective mask register and shares values with said another respective mask register for ensuring consistency of said restricting of each controller; and a shared signaling and control bus coupled to said shared signal controller and for each controller said shared signaling and control bus for said controlling of said at least one peripheral card of the respective type.

11. The system according to claim 10, wherein each controller sends respective control signals to its respective mask register, and each respective mask register forwards said respective control signals over said shared signaling and control bus only to said at least one peripheral card of the respective type.

12. The system according to claim 11, wherein one mask register of the plurality of mask registers is a master mask register for restricting a master controller to controlling said at least one peripheral card of the respective type, and all other mask registers of the plurality of mask registers are slave mask registers, each slave mask register receives master mask register values from the master mask register, and modifies its mask register values to be consistent in said restricting of its respective controller with said restricting of the master controller, as indicated by the master mask register values.

13. The system according to claim 11, wherein the shared signal controller allows a change in a value of each mask register of the plurality of mask registers only in association with the shared signal controller allowing for each of all other mask registers of the plurality of mask registers, a change of a value which is consistent in restricting each controller with said restricting of each of all other controllers of the plurality of controllers.

14. The system according to claim 11, wherein the shared signal controller changes a value of a mask register of the plurality of mask registers only if the change in the value corresponds to one of: release of control of a peripheral card of the at least one peripheral card of the respective type; and adoption of control of a peripheral card of the at least one peripheral card of the respective type which is not subject to ownership.

15. The system according to claim 11, wherein a peripheral card of said at least one peripheral card of the respective type sends type information signals to each controller of the plurality of controllers.

16. The system according to claim 15, wherein each controller initializes its respective mask register with use of the type information signals received from each peripheral card of the at least one peripheral card of the respective type.

17. A method of control management comprising:

restricting a first controller to controlling at least one peripheral card of a first type over a shared signaling and control bus using a first mask register coupled between the first controller and the shared signaling and control bus;

restricting a second controller to controlling at least one peripheral card of a second type over the shared signaling and control bus using a second mask register coupled between the second controller and the shared signaling and control bus; and sharing values between the first mask register and the second mask register for consistency of said restricting of said first controller and said restricting of said second controller.

18. The method according to claim 17, wherein the step of sharing values comprises:

receiving at the second mask register, first mask register values from the first mask register; and modifying mask register values of the second mask register to be consistent in said restricting of the second controller with said restricting of said first controller, as indicated by said first mask register values.

19. The method according to claim 17, further comprising:

allowing, with use of a contention arbitrator, a change in a value of the first mask register only in association with allowing, with use of the contention arbitrator, a change in a value of the second mask register which is consistent in restricting of the second controller with said restricting of the first controller.

20. The method according to claim 17, further comprising:

allowing, with use of a contention arbitrator, a change in a value of the first mask register only if the change in the value corresponds to one of: release of control of a peripheral card of the at least one peripheral card of the first type; and adoption of control of a peripheral card of the at least one peripheral card of the first type which is not subject to ownership.

21. The method according to claim 17, wherein said step of restricting a first controller comprises:

sending first control signals from the first controller to the first mask register; and forwarding said first control signals over said shared signaling and control bus only to said at least one peripheral card of the first type; and wherein said step of restricting the second controller comprises:

sending second control signals from the second controller to the second mask register; and forwarding said second control signals over said shared signaling and control bus only to said at least one peripheral card of the second type.

22. The method according to claim 21, wherein the first controller is an ATM OBC on a hybrid NT of a hybrid IP/ATM DSLAM; the second controller is a GigE/IP OBC on the hybrid NT; the first mask register is an ATM mask register on the hybrid NT; the second mask register is a GigE/IP mask register on the hybrid NT; the at least one peripheral card of the first type is at least one ATM LT; and the at least one peripheral card of the second type is at least one GigE/IP LT.

23. The method according to claim 21, further comprising: upon a coupling of a first peripheral card of said at least one peripheral card of the first type to said shared signaling and control bus, sending type information signals from the first peripheral card to the first controller, and initializing the first mask register by the first controller with use of the type information signals from the first peripheral card.

* * * * *